Patented May 30, 1950

2,509,495

UNITED STATES PATENT OFFICE 2,509,495

MANUFACTURE OF INTERPOLYMERS OF AROMATIC VINYL HYDROCARBONS AND OILS

Wallace Thomas Craven Hammond, Homerton, London, England, assignor, by mesne assignments, to The Sherwin-Williams Company, Cleveland, Ohio, a corporation of Ohio No Drawing. Application August 30, 1947, Serial No. 771,568

In Great Britain August 22, 1946

Section 1, Public Law 690, August 8, 1946
Patent expires August 22, 1966

20 Claims. (Cl. 260—407)

This invention is for improvements in or relating to the manufacture of interpolymers of aromatic vinyl hydrocarbons and oils and has for an object to provide a process for the production of the said interpolymers to produce products capable of being used in surface-coating compositions.

In prior British Patents Nos. 573,809, 573,835 and 580,912 and copending application No. 4,907/46 there have been described the interpolymerisation of vinyl aromatic hydrocarbons, particularly styrene, with drying and semi-drying oils under a variety of conditions, the aromatic hydrocarbons being reacted alternatively or additionally with gum varnishes or alkyd resins and, in certain instances, the vinyl aromatic hydrocarbon is added at intervals as the reaction proceeds. The said prior patents and copending applications are also concerned with the above reactions being carried out in the presence of terpene solvents which have the effect of rendering it more readily possible to obtain clear homogeneous interpolymers.

The present invention is based on the discovery that the interpolymerisation of an aromatic vinyl hydrocarbon with an oil can be controlled for the production of products having very advantageous properties by carrying out the interpolymerisation reaction in the presence of a small amount of sulphur.

According to the present invention, therefore, there is provided a process for the manufacture of an interpolymer of an aromatic vinyl hydrocarbon and a drying oil which comprises heating a reaction mixture of an aromatic vinyl hydrocarbon, a drying oil and sulphur at polymerising temperatures, the sulphur being present in an amount of from ½% to 5% by weight of the drying oil and the drying oil being present in an amount of from 10% to 70% by weight of the reaction mixture. The expression "polymerising temperature" as used herein means a temperature at which an appreciable rate of polymerisation is achieved, such temperatures ordinarily being in excess of 130° C. Preferably the amount of sulphur present in the reaction mixture is from 1% to 2½% by weight of the said oil and preferably also the amount of the said drying oil is from 25 to 65% by weight of the reaction mixture although, with the more highly conjugated drying oils, it may be found desirable to use amounts less than 50% by weight.

We have found that it is essential that the three ingredients, namely the aromatic vinyl hydrocarbon, the drying oil and the sulphur should be present in the reaction mixture before it is heated to a polymerising temperature, that is to say, it is important that the sulphur should not be heated with one only of the other two said ingredients; it will be understood that the other two ingredients may be heated together at temperatures below that at which polymerisation occurs, for example, the aromatic vinyl hydrocarbon and the drying oil may be heated together at a temperature below the polymerisation temperature, the sulphur then added and the temperature then raised to effect polymerisation. We have found, however, that provided that some sulphur is added to the mixture of the aromatic vinyl hydrocarbon with the drying oil before heating to a polymerising temperature, any opacity in the bead which may develop during the earlier stages of the polymerisation reaction can be overcome by the addition of a further quantity of sulphur and further heating of the reaction mixture to produce a further polymerisation of the ingredients.

A feature of the invention therefore consists in that a part only of the sulphur is present in the initial mixture and the residue of the sulphur is added prior to the completion of the reaction.

A further feature of the invention consists in that said mixture is heated under reflux until it attains a temperature of at least 200° C.; generally speaking, the interpolymerisation reaction is completed in about 10 hours under these conditions.

It will be appreciated from what has been said above that the proportions of the aromatic vinyl hydrocarbon to the drying oil may be varied without necessitating any variation in the ratio of the sulphur to the drying oil content of the mixture. In general, an amount of 1% of sulphur (by weight of the drying oil) is the minimum amount which will produce a bright bead, i. e. a homogeneous product having little or no opalescence.

We have found that an amount of sulphur of one and one third per cent by weight of the oil will produce a bright clear bead in the process of this invention. If amounts of sulphur of 2½% or more are added, the colour of the final interpolymer is liable to be impaired and tends to darken. The use of the higher quantities of sulphur also results in the final temperature of the reaction mixture being attained more slowly than where less sulphur is used and the final viscosity of the reaction mixture is lower when the higher quantities of sulphur are used so that it may be possible, by controlling the amount of sulphur used, to produce products having the same viscosity with different oil lengths, although probably the products obtained by utilising the higher quantities of sulphur will be darker in colour as compared with the products obtained by utilising a smaller proportion of sulphur with a mixture having a greater oil length.

A still further feature of the invention consists in that the reaction is carried out in a volatile solvent; in such a case the interpolymerisation reaction proceeds at an appreciably slower rate and consequently needs a longer period for the production of a product of a given content of polymerised aromatic vinyl hydrocarbon.

The products of the present invention can readily be dissolved in aromatic solvents but the tolerance for mineral solvents, such as white spirit, is more limited and, in general, the tolerance of the product for a solvent such as white spirit is about the ratio of 1:1.

The commonly used driers can be incorporated with the interpolymer so as to accelerate the air drying of films produced therefrom, but we have found that, when the drier is a compound of a metal which reacts with sulphur to form a sulphide, it is desirable that the mixture of interpolymer and drier should not be heated at an elevated temperature as the sulphur appears to be somewhat loosely bound and would be precipitated as the sulphide of the metal, so impairing the colour of the product; other driers, however, appear to have no such effect when the mixture is heated. Cobalt metal, used as usual in the form of a compound such as cobalt naphthenate, appears to be the best drier.

The following examples will illustrate the manner in which the invention may be carried into effect, the quantities being referred to in parts by weight.

*Example 1.*—150 parts of an alkali-refined linseed oil were mixed with 150 parts of styrene and the mixture was heated under reflux until it had attained a temperature of 130° C.; at this point, no substantial interpolymerisation had occurred. When the temperature of 130° C. had been attained, two parts of finely divided sulphur were added to the mix and the mixture was stirred until the sulphur had gone into solution.

The heating of the mixture was then continued under reflux until the temperature of the reaction mixture had risen to 200° C. which temperature was attained in 10 hours.

The reaction mixture thus obtained cools to a bright clear viscous oil which is pale straw in colour and which yields a bright bead. The reaction product may be hardened by oxidation in air with the aid of the conventional driers or it may be dissolved in a suitable solvent.

In contrast with the foregoing, a parallel experiment was carried out in which the same quantities of alkali-refined linseed oil and styrene were heated under the same conditions except that the sulphur was omitted. The reaction mixture attained a temperature of 200° C. in 12 hours, the product at this stage cooling to an opaque buttery mass.

*Example 2.*—75 parts of alkali-refined linseed oil were added to 225 parts of styrene and the mixture was heated under reflux, as in Example 1 to a temperature of 130° C. at which point 1.5 parts of sulphur were added and stirred in until dissolved. The heating of the mixture was continued under reflux until a temperature of 200° C. was obtained after 6 hours heating.

The product cools to a bright clear balsam pale straw in colour and, as with the product of Example 1, yielding a bright bead.

*Example 3.*—200 parts of a 7 poise dehydrated castor oil were added to 133 parts of styrene and the mixture heated, as in the preceding examples, to 130° C. under reflux whereupon 3 parts of sulphur were added and dissolved with stirring.

The heating of the reaction mixture was continued under reflux until it had reached a temperature of 200° C. at the end of 5 hours whereafter the reaction mixture was held at 200° C. for a further period of 3 hours to effect bodying of the product. The reaction mixture was a dark clear oil which formed a clear film when dried.

*Example 4.*—100 parts of China-wood oil were added to 200 parts of styrene, as in the preceding examples, on attainment of a temperature of 130° C. sulphur, in an amount of 2.5 parts, was stirred in until it had dissolved. The heating of the reaction mixture was continued under reflux until it had attained a temperature of 175° C. at the end of 7½ hours. The product was a clear viscous oil which dried to a clear film.

*Example 5.*—220 parts of mixed drying oilstand oil were added to 180 parts of styrene admixed with 266 parts of xylene. Sulphur, in an amount of 3 parts, was added to the mixture which was thereafter heated under reflux for 36 hours at which time the solids content of the varnish was 52% and the viscosity thereof was 25 seconds as measured in a No. 4 form cup at 25° C.

The interpolymers prepared by the process of the present invention are particularly valuable for use as a film-forming ingredient for use in the manufacture of surface-coating compositions and the interpolymers can be compounded with pigments, extenders, solvents or driers to produce various coating compositions and the present invention includes surface-coating compositions comprising as a film-forming ingredient the interpolymers produced by the process of this invention.

It will be understood that, where a clear varnish is required, the amount of sulphur to be added to the mixture of the aromatic vinyl hydrocarbon and the drying oil must be such as will produce a bright bead but it will be appreciated that, where a pigmented composition is to be produced, a slight opacity or opalescence in the product is not disadvantageous and products produced utilising 1% or less of sulphur, to a minimum of ½% by weight of the oil, can still be utilised as the film-forming ingredient of a pigmented surface-coating composition.

I claim:

1. A process for the manufacture of an interpolymer of an aromatic vinyl hydrocarbon and a drying oil which comprises heating a reaction mixture consisting essentially of an aromatic vinyl hydrocarbon, a drying oil and sulphur at polymerising temperatures, the sulphur being present in an amount of from ½% to 5% by weight of the drying oil and the drying oil being present in an amount of from 10% to 70% by weight of the reaction mixture.

2. A process for the manufacture of an interpolymer of an aromatic vinyl hydrocarbon and a drying oil which comprises heating a reaction mixture consisting essentially of an aromatic vinyl hydrocarbon, a drying oil and sulphur at polymerising temperatures, the sulphur being present in an amount of from 1% to 2½% by weight of the drying oil and the drying oil being present in an amount of from 10% to 70% by weight of the reaction mixture.

3. A process for the manufacture of an interpolymer of an aromatic vinyl hydrocarbon and a drying oil which comprises heating a reaction mixture consisting essentially of an aromatic vinyl hydrocarbon, a drying oil and sulphur at polymerising temperatures, the sulphur being present in an amount of from ½% to 5% by weight of the drying oil and the drying oil being present in an amount of from 25% to 65% by weight of the reaction mixture.

4. A process for the manufacture of an interpolymer of an aromatic vinyl hydrocarbon and a drying oil which comprises heating a reaction mixture consisting essentially of an aromatic vinyl hydrocarbon, a drying oil and sulphur at polymerising temperatures, the sulphur being present in an amount of from 1% to 2½% by weight of the drying oil and the drying oil being present in an amount of from 25% to 65% by weight of the reaction mixture.

5. A process according to claim 1 wherein said drying oil is a highly conjugated drying oil and is used in an amount not exceeding 50% by weight of the composition.

6. A process according to claim 1 wherein a part only of the sulphur is present in the initial mixture and the residue of the sulphur is added prior to the completion of the reaction.

7. A process according to claim 1 wherein said mixture is heated under reflux until it attains a temperature of at least 200° C.

8. A process according to claim 1 wherein the reaction is carried out in a volatile solvent.

9. A process for the manufacture of an interpolymer of a styrene and a drying oil which comprises heating a reaction mixture consisting essentially of a styrene, a drying oil and sulphur at polymerising temperatures, the sulphur being present in an amount of from ½% to 5% by weight of the drying oil and the drying oil being present in an amount of from 10% to 70% by weight of the reaction mixture.

10. A process for the manufacture of an interpolymer of a styrene and a drying oil which comprises heating a reaction mixture consisting essentially of a styrene, a drying oil and sulphur at polymerising temperatures, the sulphur being present in an amount from 1% to 2½% by weight of the drying oil and the drying oil being present in an amount of from 10% to 70% by weight of the reaction mixture.

11. A process for the manufacture of an interpolymer of a styrene and a linseed oil which comprises heating a reaction mixture consisting essentially of a styrene, a linseed oil and sulphur at polymerising temperatures, the sulphur being present in an amount of from ½% to 5% by weight of the linseed oil and the linseed oil being present in an amount of from 10% to 70% by weight of the reaction mixture.

12. A process for the manufacture of an interpolymer of a styrene and a linseed oil which comprises heating a reaction mixture consisting essentially of a styrene, a linseed oil and sulphur at polymerising temperatures, the sulphur being present in an amount of from 1% to 2½% by weight of the linseed oil and the linseed oil being present in an amount of from 10% to 70% by weight of the reaction mixture.

13. A process for the manufacture of an interpolymer of a styrene and a dehydrated castor oil which comprises heating a reaction mixture consisting essentially of a styrene, a dehydrated castor oil and sulphur at polymerising temperatures, the sulphur being present in an amount of from ½% to 5% by weight of the dehydrated castor oil and the dehydrated castor oil being present in an amount of from 10% to 70% by weight of the reaction mixture.

14. A process for the manufacture of an interpolymer of a styrene and a dehydrated castor oil which comprises heating a reaction mixture consisting essentially of a styrene, a dehydrated castor oil and sulphur at polymerising temperatures, the sulphur being present in an amount of from 1% to 2½% by weight of the dehydrated castor oil and the dehydrated castor oil being present in an amount of from 10% to 70% by weight of the reaction mixture.

15. A process for the manufacture of an interpolymer of a styrene and a China-wood oil which comprises heating a reaction mixture consisting essentially of a styrene, a China-wood oil and sulphur at polymerising temperatures, the sulphur being present in an amount of from ½% to 5% by weight of the China-wood oil and the China-wood oil being present in an amount of from 10% to 50% by weight of the reaction mixture.

16. A process for the manufacture of an interpolymer of a styrene and a China-wood oil which comprises heating a reaction mixture consisting essentially of a styrene, a China-wood oil and sulphur at polymerising temperatures, the sulphur being present in an amount of from 1% to 2½% by weight of the China-wood oil and the China-wood oil being present in an amount of from 10% to 50% by weight of the reaction mixture.

17. A process for the manufacture of an interpolymer of a styrene and a mixed drying oil-stand oil which comprises heating a reaction mixture consisting essentially of a styrene, a mixed drying oil-stand oil and sulphur at polymerising temperatures, the sulphur being present in an amount of from ½% to 5% by weight of the mixed drying oil-stand oil and the mixed drying oil-stand oil being present in an amount of from 10% to 70% by weight of the reaction mixture.

18. A process for the manufacture of an interpolymer of a styrene and a mixed drying oil-stand oil which comprises heating a reaction mixture consisting essentially of a styrene, a mixed drying oil-stand oil and sulphur at polymerising temperatures, the sulphur being present in an amount of from 1% to 2½% by weight of the mixed drying oil-stand oil and the mixed drying oil-stand oil being present in an amount of from 10% to 70% by weight of the reaction mixture.

19. A process for the manufacture of an interpolymer of a styrene and a drying oil which comprises heating a reaction mixture consisting essentially of a styrene, a drying oil and sulphur at polymerising temperatures, the sulphur being present in an amount of from about one and a third per cent by weight of the drying oil and the drying oil being present in an amount of from 10% to 70% by weight of the reaction mixture.

20. A process for the manufacture of an interpolymer of a styrene and a drying oil which comprises heating a solution in an aromatic hydrocarbon of a mixture consisting essentially of a styrene, a drying oil and sulphur at polymerising temperatures, the sulphur being present in an amount of from about one and a third per cent by weight of the drying oil and the drying oil being present in an amount of from 10% to 70% by weight of the solution in an aromatic hydrocarbon.

WALLACE THOMAS CRAVEN HAMMOND.

REFERENCES CITED

The following references are of record in the file of this patent:

UNITED STATES PATENTS

| Number | Name | Date |
|---|---|---|
| 1,891,203 | Ambros et al. | Dec. 13, 1932 |
| 2,111,427 | Kittredge | Mar. 15, 1938 |
| 2,190,906 | Stoesser et al. | Feb. 20, 1940 |
| 2,190,915 | Bass et al. | Feb. 20, 1940 |
| 2,219,862 | Bradley et al. | Oct. 29, 1940 |